Nov. 26, 1929. W. B. WESCOTT 1,737,133
RUBBER FIBER ARTICLE AND PROCESS OF MAKING THE SAME
Filed July 12, 1927
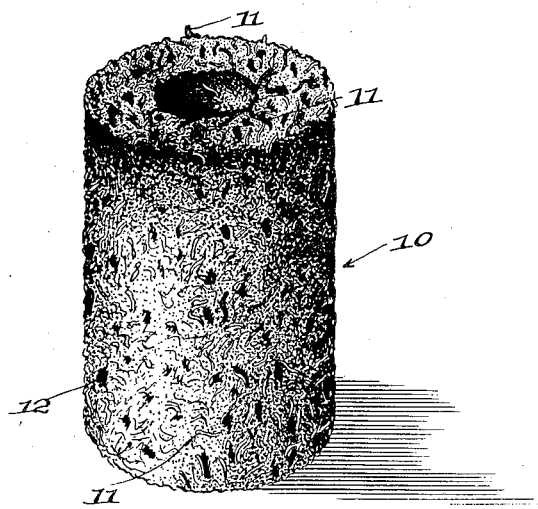
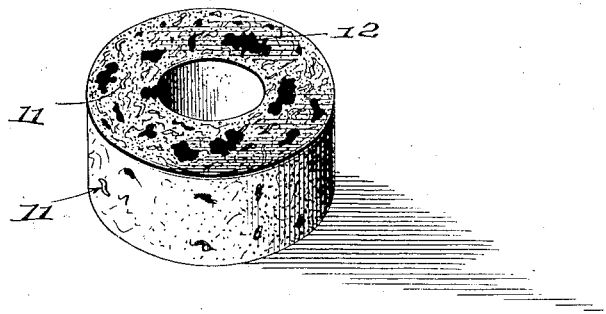

Patented Nov. 26, 1929

1,737,133

UNITED STATES PATENT OFFICE

WILLIAM B. WESCOTT, OF BOSTON, MASSACHUSETTS, ASSIGNOR TO RUBBER LATEX RESEARCH CORPORATION, OF BOSTON, MASSACHUSETTS, A CORPORATION OF MASSACHUSETTS

RUBBER-FIBER ARTICLE AND PROCESS OF MAKING THE SAME

Application filed July 12, 1927. Serial No. 205,256.

This invention relates to rubber-fiber articles and processes of making the same; and it comprises a relatively hard, dense and resilient rubber-fiber article comprising cords, threads or fibers of substantial length disposed in random arrangement, bonded together by a continuous body of rubber extending within and permeating said cords, threads or fibers, said body of rubber comprising new rubber derived in situ from liquid latex and also particles of comminuted prevulcanized rubber; and it further comprises a method of making such articles wherein compound articles of rubber and fabric or cord are disintegrated and separated in such manner as to give a fraction consisting mainly of rubber and a fraction consisting mainly of fiber; the latter fraction, together with as much of the rubber fraction as may be desired, being impregnated with latex, (usually stabilized against the coagulating effect of the comminuted rubber by an added animal proteid), in such manner as to produce thorough wetting of all the fiber and the wet mass being molded to desired shape, dried and cured or vulcanized; all as more fully hereinafter set forth and as claimed.

One purpose of this invention is to produce a tough resilient product suitable for "heavy duty" service, such as the absorption of mechanical shock and vibration under reciprocating mechanisms and the like, industrial truck wheels and conveyor mechanism rollers, silent pads for caterpillar tractors, wheels for casters and the like, etc. in which great strength is obtained by rubber bonded cords or threads, while still having a limited resiliency.

The utilization of old compound fabric and rubber articles, such as tire scrap, is a technical problem. Sometimes, the scrap is treated in reclaiming plants as a whole by digestion with caustic soda solution to destroy the fiber and extract some of the sulfur, giving reclaimed rubber. In this operation, there is a waste of fiber. Before reclaiming, the fiber may be separated mechanically to a greater or less extent. This is practicable, since in tires and the like the rubber and fiber or cords are largely positioned in different layers. In this mechanical separation, however, such rubber as clings to the fiber is wasted. Sometimes, the recovered fiber is comminuted to a fluff, flock or lint and the product then worked into rubber on the mill. Here, however, it serves only as a filler; it being impracticable by present day methods to work fiber of substantial length uniformly into high grade rubber on the mill. The length of milling required for uniform incorporation comminutes the fiber. In a thoroughly compounded article of this type, it is rare to find fiber having lengths greater than 0.10 inch. Fiber in fluff form stiffens the compound but adds nothing to the tensile strength of the final article; it is merely a filler. Cords or threads, in small amount, may be worked into rubber on the mill, particularly if softeners, such as oils, are used, but the maximum amount of cord which can be milled into rubber is small and further the exterior only of the cord is "wet" by the rubber. This is also true of rubber cements, although in this case more cord may be superficially bonded. As the cords or threads are tightly twisted and, by reason of the adhering specks of friction rubber, are not readily opened up, rubber cements will not penetrate. A rubber "solution" of as low viscosity as that of the normal 30 per cent latex could contain not more than about 2 per cent of rubber. While it is true that the so-called "rubbber solvents", benzol, gasoline, and the like, "wet" fiber more readily than does water, it is not possible to deposit, from a "solution" of rubber which is sufficiently fluid to permeate the cord, such an amount of rubber as is required to fill the cord interstices, even when these are brought to the irreducible minimum by compression so great as to be just short of compressive destruction of the fiber.

I have discovered that an amount of rubber sufficient to fill the voids in the cords, when the latter are subjected to such pressures as are commonly used in curing rubber, can be deposited therein from normal latex while the cords are uncompressed and that a product may be so obtained in which all of the fiber within the cords is bonded by the permeating rubber.

In the present invention, as in the acknowledged prior art, I perform a preliminary rough mechanical separation of fiber and rubber with tire scrap or similar material containing both rubber and cotton cord or fabric. In American tire scrap, fiber now largely occurs in the form of cords; and such scrap is the most desirable for the present purposes. The separated cords or fibers resulting from this mechanical separation are obtained in short pieces, averaging, for the most part, between 0.50 and 1.5 inches. There will be a percentage of fines and some longer cords or fiber; but the bulk of the fiber will be as stated. Fines and over-sized material can be mechanically removed, if this be desired. In general, I prefer to remove both fines and over-size, because the first, serving only as a filler, increases the amount of bonding rubber required without correspondingly increasing the strength or utility of the product, while the latter renders the desired uniform random distribution of the fiber more difficult to secure.

In breaking up the scrap and comminuting, most of the rubber is torn away from the fiber or cords and may be mechanically removed. It carries but a small percentage of fiber as a rule and is sent to the rubber reclaiming apparatus.

In the present invention, I utilize the mechanically separated cords, and as much of the comminuted rubber as may be desired, to produce hard, dense, resilient, molded shapes suitable for shock absorbers, wheels, casters and many other purposes. With the best practicable mechanical separation of the tire scrap, the cords will carry from 3 per cent to 5 per cent of adhering rubber, this rubber occurring as isolated spots or bodies. Tires and similar composite articles are made by frictioning and while there is a good mechanical union between the rubber and the fabric or cords, the rubber does not extend within the fiber bundles forming the body of the cords or fabric. There is more of a locking union than of any real cohesion. The individual lengths of cords usually retain much, or most, of their original twist but in comminution their ends become roughened and have a brush-like appearance. Mostly, the material I use carries from 3 per cent to 5 per cent of adhering rubber, depending on the method of separation.

In the present invention I bond together, not only the cords and particles of comminuted rubber, but the individual fibers within the cords by a continuous body of new rubber derived, in situ, from latex, this body of rubber being integral and extending through the cords, threads or fiber bundles including the old rubber. The old rubber particles, adhering to the cords or allowed to remain with the fiber, are surrounded and bonded by the new rubber.

Latex is a liquid extracted by tapping rubber trees and as imported into this country usually carries about 30 per cent of rubber, or rubber yielding bodies, so finely dispersed that, for practical purposes, the liquid behaves like a true solution, readily permeating capillaries. Commercial latex usually contains 2 per cent or 3 per cent of ammonia as a preservative. Latex is readily coagulated by acid, by certain common rubber fillers, such as carbon black, asbestos, etc., and by vulcanized rubber, particularly when freshly comminuted or cut to expose unoxidized surfaces. The coagulative effect of comminuted rubber may be prevented by small additions of animal proteid, particularly hemoglobin, as set forth in the Day application, Serial No. 158,828, which issued on October 20, 1928, as Patent No. 1,689,581. Hemoglobin is a proteid coagulable by heat and in vulcanizing carefully dried articles containing hemoglobin it cures and adds to the strength of the bond as described in my copending application Serial No. 201,207, filed June 24, 1927. Mixtures containing latex protected by hemoglobin permit of the expression of excess latex from the cords, which are not sticky at this time. The wet mixture may be readily formed into desired shapes. Instead of a simple molding operation, the material containing latex treated with hemoglobin or the like, can be extruded in the form of a tubulus, which may be compressed and vulcanized.

In practical embodiments of the present invention, I thoroughly wet the fibrous fraction of the scrap with latex. This will give a sufficient amount of rubber for the present purposes. This I usually accomplish by stirring the scap fiber and rubber into an excess of latex. I sometimes preliminarily wet the fiber, particularly in the case of cords, with boiling water, express as much of this water as possible, by any convenient means such as a basket type centrifuge and then stir the thoroughly dampened fiber into the latex. This expedites the penetration of the latex without, however, causing too great a dilution. Another useful expedient, which however cannot be used unless a protective colloid, such as hemoglobin, has been added to the latex, is to pass the cords through rolls beneath the surface of the latex bath or to tumble the mass in an oscillating perforated cylinder partially submerged in the latex bath, thus expelling the contained air and facilitating the penetration of the latex. In any event, the cords are first thoroughly saturated with latex and then freed of excess latex, first using drainage and then any other convenient means. The basket centrifuge may be used for this latter purpose or the wet mass may be directly compressed in a perforated mold to express the excess latex and yield the desired shape at one operation. This shape should approximate in two dimensions the size of the contemplated product.

At this stage in the operation, I have a wet molded mass carrying latex-saturated cords and particles of prevulcanized rubber. This I usually dry to obtain a pervious mass carrying a filmiform layer of latex rubber gel on all fiber and old rubber surfaces. Drying is advantageously carried so far that the amount of moisture is less than the natural water of condition of the fiber. While I usually prefer to dry to produce a gel of latex rubber, it is sometimes desirable to form a tough reticulate coagulum, which is conveniently obtained by submerging the latex-wet molded mass in a 20 per cent to 30 per cent acetic acid solution. The coagulum is preferred when the product is not to be vulcanized, as it is tough and has good "nerve". The gel, on the other hand, is much more suitable for vulcanization, closely resembling milled or plasticized rubber in its vulcanizing characteristics. When vulcanization is intended, sulfur and, if desired, suitable accelerators are added to the fluid latex before impregnation of the fiber. Ammonium polysulphide may be used.

Sulfur contained in the latex, and intended for vulcanizing purposes, exhibits interesting properties. Even in the presence of an excess of fluid latex, substantially all of the sulfur introduced therewith remains in and on the fiber after expression of the excess latex. In practice, the requisite amount of sulfur, either as ordinary fine sulfur or combined sulfur or sulfur in a colloidal state, is mixed in with the fluid latex, or is weighed out with the fiber without regard to the latex excess. Practically none of the sulfur goes with the latex which is expressed. In this respect, the latex behaves in a different manner than the solvents employed for rubber cements.

The warm dried material as it comes from the dryer can be compressed in the final mold and vulcanized. This compression obliterates voids and converts the rubber, then existing to a large extent in film form as stated, into a continuous integral body. The article so produced is of surprising mechanical strength and contains the new rubber in gel form; a form comparable in its curing characteristics to long milled raw rubber, as stated.

Generally, I desire to produce vulcanized final articles. In this case, sulfur and accelerators are incorporated into the mass with the latex. Fillers can also be incorporated at this time, if desired. Comminuted prevulcanized rubber, such as adheres to the cords in small amounts and as may be added in predetermined amounts to the mix, tends to coagulate the latex as stated, as do carbon black and certain other common rubber fillers and pigments. As coagulation, even to the flocculent state, tends to prevent thorough impregnaton of the fiber bundles by the latex, I add an effective protective colloid. Hemoglobin is best, not only because it is effective in small amounts, 5 per cent on the latex rubber being usually ample, but because of its low viscosity in solution.

Where a vulcanized article is desired, after the drying and compression described, the article is subjected to a suitable curing temperature, or the final compression may take place in the mold while curing. As in the case of all rubber compositions, the time and pressures employed during vulcanization affect the properties of the final product. In the present invention, wherein a hard, but resilient material is usually sought, the cures may be relatively short, say for twenty minutes with sixty pounds of steam or less. When the final product is to have a thickness of the order of an inch, the cure may advantageously be accomplished by vulcanizing for twenty minutes with fifty pounds steam pressure, using three per cent of sulfur. For very thick articles, partial or step cures are best.

A cure of this character, that is, a light cure for the latex-rubber bond, is desirable so that the product shall be sensitive in response to vibratory loads. Longer cures with more sulfur render the article harder and less resilient, but have no appreciable advantageous effect on the tensile strength. I have found that between 10 per cent and 15 per cent by weight of latex rubber is required to cover all the fiber surfaces and yield a continuous integral bond and that, with bonding rubber between these limits, a compressive force of about one ton to the square inch, at curing temperatures, is sufficient to obliterate completely the interstitial voids. With more bonding rubber, less pressure is required, but, with less than about 10 per cent bonding rubber, the bond cannot be made continuous throughout the fiber mass; voids remain and the product will absorb water in amounts much in excess of that taken up when there is a sufficiency of bond.

It is to be understood that a vulcanized article containing cords or threads that have merely been treated with ordinary rubber cements are not regarded in the same light as my articles, wherein latex is employed to wet the fibers. There are several distinctions between the two. Thus, a mass of fibers cemented with ordinary rubber and solvent, such as gasoline or the like, has a lower specific gravity than a similar mass of fibers treated with latex. The cemented article contains air pockets or voids between the individual fibers, whereas, if latex be employed, these spaces are filled with bonding rubber.

The difference in these spaces also reveals itself in the capillarity of the two articles. Cemented materials absorb more water by capillary action than do latex impregnated masses, as, in the former, the voids exist as such, while in the latter, the spaces are obliterated by compression after drying. These effects react adversely on cemented articles, due to chafing actions between the adjacent dry fibers. The service life of latex bonded fibers is greater, particularly under vibratory loads, for which service the present articles are particularly adapted. Since the bond in mere cemented articles is not as good as it is in latex impregnated fiber compositions, the strength of the latter is higher.

In one advantageous embodiment of my invention, making small wheels, a tubulus is molded of latex-wet fiber; this tubulus having approximately the diameter of the desired finished wheel but having a length several times that of the final product. After the drying stage and in the compressive stage, longitudinal pressure is exerted, which squeezes the mass together and forces the bond into integral union, eliminating all voids. In general, I prefer to keep the new rubber at a safe minimum, i. e. between 10 per cent and 15 per cent or just enough to yield a continuous bond, and to add such comminuted old rubber particles as may be desired to increase resiliency. Articles made according to this invention may be still further reenforced by the inclusion, at the time of wet molding, of metal reenforcing elements such as metal rods or shapes, expanded metal, wire cloth or wire. If wire cloth or expanded metal is used the mesh or opening should, in general, not be less than one-quarter inch.

In the accompanying drawing, I have shown, more or less diagrammatically, certain embodiments of my invention, wherein Fig. 1 is a view in perspective of such a prism or tubulus of rubber and fiber as just mentioned after shaping and drying but before compression; and Fig. 2 is a similar view of the tubulus after compression and vulcanization.

As illustrated in Fig. 1, the uncompressed prism or tubulus 10 is composed of a mass of fibers or cords 11, disposed in random arrangement and interlocked with each other. Shown as occurring between certain fibers are small pieces of vulcanized rubber 12, which may have been included or remained adhering to the cords in the shredding process.

Upon compression, the length of the tubulus is considerably shortened, as shown in Fig. 2, and the fibers are now matted upon each other and are held in position by the rubber bond. The mass does not alter its shape appreciably when cured, but the cords or fibers no longer protrude from the shape, lying flat and being buried in the rubber. Dark spots of compounded scrap rubber are apparent, and are due to the adhering particles of rubber not removed from the cords during the shredding operation or to such as may have been added to increase resiliency.

As stated, the finished articles may be put to a variety of uses, but are particularly desirable where vibratory loads are encountered. The wheel illustrated in Fig. 2, formed in appropriate sizes, may serve as a roller skate wheel, as a caster or as an industrial truck wheel. As a wheel, the article has the advantage of providing its own non-skid surface without the necessity of including a molded design, since the cords impart a high surface coefficient of friction and resist slippage. The material being mainly matted fiber in random arrangement, the tensile strength is very great. The new rubber is present in such amount as to give a maximum high strength of bond and impart some resiliency. Further resiliency is imparted by imbedded and bonded particles of compounded old rubber scrap. No part of the fiber is "dry" (free of rubber) and the shaped article behaves as if homogeneous. There is no tearing apart or separation between fiber and rubber under stress. The distribution of surface load is, by reason of the interlocked and resiliently bonded cords, very great; thus a slab two inches thick, compressed between a cylindrical hydraulic plunger three inches in diameter and a hard pine base, destructively compressed the pine over a circular area nine inches in diameter. In the absence of more comminuted rubber particles than those normally adhering to the fiber, i. e. about 5 per cent by weight and with 12.5 per cent or optimum of bonding rubber, cured with 3 per cent sulfur, the first signs of compressive failure appeared at slightly over two tons to the square inch when the load was applied between the plunger and platen of a hydraulic compression machine, without any lateral support for the test sample.

In other shapes or sizes, the material may be used for supporting vibrating machinery, such as reciprocating punches, or internal combustion engines. The great utility of the composition in this connection may be largely accredited to the employment of latex as a liquid in the impregnating and subsequent molding operation, as the bond so obtained causes the formation of a practically unitary and integral mass which resists shearing loads that would destroy bundles of cords superficially bonded with rubber cement. The articles as prepared have the resilience necessary to resist destruction under such loads, and are also hard and dense, thus meeting requirements of strength which cannot be obtained in articles of pure rubber or of rubber containing lint or finely comminuted fiber. The resiliency of articles produced under this invention differs markedly from that of ordinary rubber compounds and is ideally suited to mechanical purposes, in that, in the first instance it is that of a very high grade compound but the rate of resilient deformation changes very rapidly, as the cords come into play, until a high resistance is built up. It has a sharply limited resilient deformability with great ultimate compressive resistance.

The process of this invention has, among its many advantages over the usual practice, that of so utilizing the material entering into the product as to produce no waste or trimmings requiring reworking.

The invention as embodied in an article of manufacture is characterized by the provision of a relatively hard and dense article, that is, one having a hardness approaching that of hard rubber, which is yet resilient, that is, is not brittle or unyielding like hard rubber. Structurally, the article is composed of a molded rubber and fiber composition, wherein the fibers occur as cords of appreciable length that are disposed in random arrangement and which are impregnated and bonded with vulcanized latex rubber.

This application contains subject matter in common with my copending application Serial No. 678,673, filed December 5, 1923, which issued on October 18, 1927, as Patent No. 1,645,635, wherein I have described a like composition of matter, but have claimed, in view of a requirement for division, a paving block which includes a specified type of reenforcement desirable therein. To the extent that there is common subject matter in the two applications, I desire to have this application considered as related.

What I claim is:—

1. The method of making molded articles of rubber and fiber which comprises preparing a mass of fibers in the form of cords having a length of substantially 0.50 to 1.5 inches, saturating the mass with rubber latex containing a coagulable proteid as a protective colloid to enable such saturating, shaping the wet mass in a form similar to that of the article finally desired, drying the shaped article, compressing the article, and curing the article.

2. The process of making rubber-bonded fiber wheels which comprises mechanically separating tire scrap and the like into fiber and rubber, said fiber containing a small proportion of adhering rubber, mixing the fiber with vulcanizing materials, adding sufficient latex to thoroughly wet the mass, molding into a tubulus having about the diameter of the proposed wheel but several times as thick, drying and vulcanizing in a mold under sufficient pressure to obliterate the voids and produce the wheel desired.

3. As an article of manufacture adapted to withstand high pressures and resilient to a limited extent a mass composed mainly of cords having a length of from 0.50 to 1.5 inches disposed in interlocked and random arrangement and bonded with rubber derived, in situ, from latex, molded to shape and vulcanized.

4. The method of making molded articles of rubber and fiber which comprises shredding tire scrap to provide cords of 0.50 to 1.50 inches in length, separating the cords from the major portion of the rubber in the scrap, saturating the cords with rubber latex containing a protective colloid enabling complete saturating, forming the saturated cords to a predetermined shape, drying the mass and vulcanizing the same with the aid of heat and pressure.

5. As an article of manufacture, a poreless shaped resilient mass adapted to withstand high compression without deformation and composed mainly of tire scrap containing cords between lengths of 0.50 to 1.50 inches bonded with vulcanized rubber derived in situ from rubber latex.

6. As an article of manufacture, a shaped mass of randomly disposed cords bonded interiorly and exteriorly by a continuous body of vulcanized rubber.

7. As an article of manufacture, having limited resiliency, a molded shape composed of randomly disposed cords and a minor amount of vulcanized bonding rubber surrounding and permeating said cords.

8. As an article of manufacture having limited resiliency, a molded shape composed of randomly disposed cords and particles of compounded rubber bonded together by a continuous body of vulcanized rubber surrounding said particles of compounded rubber and permeating said cords.

9. The process of making products of limited resiliency containing comminuted rubber-fiber articles bonded together by vulcanized rubber in minor amount which comprises preparing twisted fiber aggregates in the form of cords having a length of substantially 0.5 to 1.5 inches and small particles of compounded vulcanized rubber from old tires, saturating the cords with rubber latex containing a protective colloid and a sufficiency of vulcanizing agents, expressing the excess latex, shaping the wet mass in a prismatic form similar in two dimensions to that of the article finally desired, drying the shaped article, compressing the article along the third dimension thereof and vulcanizing the article.

10. The method of making a rubber and fiber article which comprises admixing a quantity of twisted fiber aggregates containing vulcanized rubber with fluid latex containing bodies preserving it against coagulation by said vulcanized rubber and enabling permeation of said aggregates by said latex, thereby making a wet plastic mass, shaping the wet mass into a form, drying the mass to remove water and to form a continuous bond of rubber derived from latex bonding said fiber aggregates and vulcanized rubber, compressing said dried shape to effect a final shape for the article and obliterate the voids left in drying and subjecting the compressed shape to vulcanization.

11. As a new article, a rubber bonded resilient wheel adapted to withstand high compression without deformation and composed mainly of relatively short lengths of twisted cord carrying rubber, said cord being bonded by an integral mass of vulcanized rubber derived from latex permeating said cord, said latex containing a coagulable proteid enabling permeation and forming part of the final bond, the bonding rubber carrying isolated included masses of old rubber from another source.

In testimony whereof, I have hereunto affixed my signature.

WILLIAM B. WESCOTT.